(12) United States Patent
Nakajima et al.

(10) Patent No.: US 7,534,045 B2
(45) Date of Patent: May 19, 2009

(54) BEARING WITH IC TAG AND SEAL FOR THE SAME

(75) Inventors: Tatsuo Nakajima, Iwata (JP); Kazutoyo Murakami, Iwata (JP)

(73) Assignee: NTN Corporation, Osaka (JP)

( * ) Notice: Subject to any disclaimer, the term of this patent is extended or adjusted under 35 U.S.C. 154(b) by 297 days.

(21) Appl. No.: 10/580,704

(22) PCT Filed: Nov. 22, 2004

(86) PCT No.: PCT/JP2004/017369

§ 371 (c)(1),
(2), (4) Date: May 25, 2006

(87) PCT Pub. No.: WO2005/052398

PCT Pub. Date: Jun. 9, 2005

(65) Prior Publication Data
US 2007/0126587 A1 Jun. 7, 2007

(30) Foreign Application Priority Data
Nov. 25, 2003 (JP) ............................. 2003-393361
Dec. 12, 2003 (JP) ............................. 2003-414349

(51) Int. Cl.
*F16C 32/04* (2006.01)
*G01P 3/00* (2006.01)
*G01R 11/02* (2006.01)

(52) U.S. Cl. ...................... 384/448; 324/136; 324/160; 340/572.1

(58) Field of Classification Search ......... 384/443–449, 384/484, 500, 535, 624; 340/10.41, 447, 340/572.8, 870.16, 870.3, 870.31, 572.1; 324/173–174, 160, 438, 207.25, 136
See application file for complete search history.

(56) References Cited
U.S. PATENT DOCUMENTS
4,259,637 A * 3/1981 Bloomfield et al. ......... 324/173
(Continued)

FOREIGN PATENT DOCUMENTS
JP 7-197938 8/1995
(Continued)

OTHER PUBLICATIONS
International Search Report for PCT/JP2004/017369 dated Mar. 29, 2005 (2 pages).
(Continued)

*Primary Examiner*—Marcus Charles
(74) *Attorney, Agent, or Firm*—Osha • Liang LLP

(57) ABSTRACT

To provide an IC-tagged bearing device, in which the IC tag can easily and assuredly fitted to the bearing device and can easily be protected from an environment of elevated temperature. A sealing member 5 for sealing a bearing space delimited between inner and outer races 1 and 2 has the IC tag 9 attached thereto. The sealing member 5 includes a core metal 6 provided with an elastic element 7, which is made of rubber or resin, and the IC tag 9 is held embedded in this elastic element 7. The IC tag 9 may be fixedly either bonded by vulcanization or engaged in a groove defined in the elastic element 7.

7 Claims, 7 Drawing Sheets

U.S. PATENT DOCUMENTS

| | | | |
|---|---|---|---|
| 4,555,189 A * | 11/1985 | Donkin | 384/493 |
| 5,523,681 A | 6/1996 | Hajzler et al. | |
| 5,764,138 A * | 6/1998 | Lowe | 340/447 |
| 5,851,074 A * | 12/1998 | Sakamoto | 384/448 |
| 5,898,388 A * | 4/1999 | Hofmann et al. | 340/870.31 |
| 5,986,448 A * | 11/1999 | Yada et al. | 324/173 |
| 6,002,248 A * | 12/1999 | Binder | 324/160 |
| 6,018,299 A | 1/2000 | Eberhardt | |
| 6,091,332 A | 7/2000 | Eberhardt et al. | |
| 6,107,920 A | 8/2000 | Eberhardt et al. | |
| 6,130,613 A | 10/2000 | Eberhardt et al. | |
| 6,173,210 B1 | 1/2001 | Bjornson et al. | |
| 6,246,327 B1 | 6/2001 | Eberhardt | |
| 6,501,382 B1 * | 12/2002 | Rehfus et al. | 340/572.8 |
| 6,559,633 B1 * | 5/2003 | Nachtigal et al. | 324/174 |
| 6,662,062 B1 | 12/2003 | Bjornson et al. | |
| 7,011,451 B2 * | 3/2006 | Tajima et al. | 384/448 |
| 7,320,258 B2 * | 1/2008 | Tawara | 384/448 |
| 2003/0093188 A1 * | 5/2003 | Morita et al. | 340/438 |
| 2005/0089253 A1 * | 4/2005 | Koike et al. | 384/448 |

FOREIGN PATENT DOCUMENTS

| | | | |
|---|---|---|---|
| JP | 9-196946 | | 7/1997 |
| JP | 10-315-669 A | * | 12/1998 |
| JP | 2002-506257 | | 2/2002 |
| JP | 2002-298116 | | 10/2002 |
| JP | 2004-263724 | | 9/2004 |
| JP | 2004263724 A | * | 9/2004 |
| WO | WO-02/101675 | | 12/2002 |
| WO | WO 2004072747 A1 | * | 8/2004 |

OTHER PUBLICATIONS

Patent Abstracts of Japan 09-196946 dated Jul. 31, 1997 (2 pages).
Patent Abstracts of Japan 2004-263724 dated Sep. 24, 2004 (2 pages).
Patent Abstracts of Japan 2002-298116 dated Oct. 11, 2002 (2 pages).

* cited by examiner

Fig. 1A
Fig. 1B
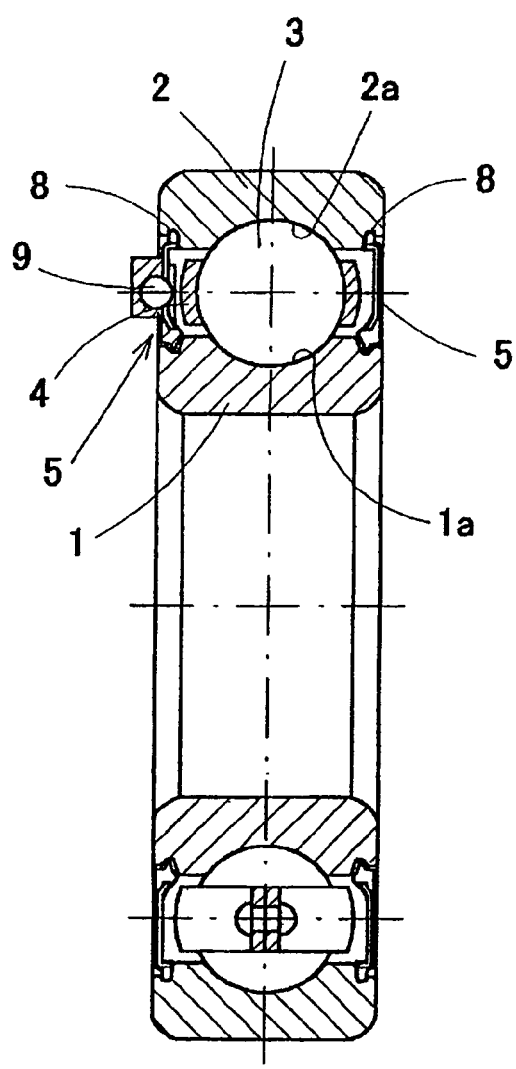
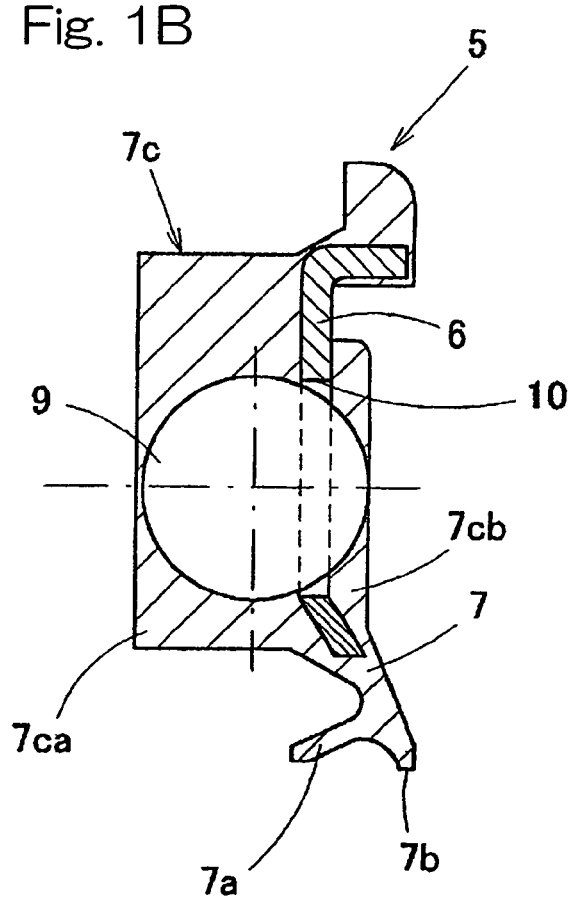

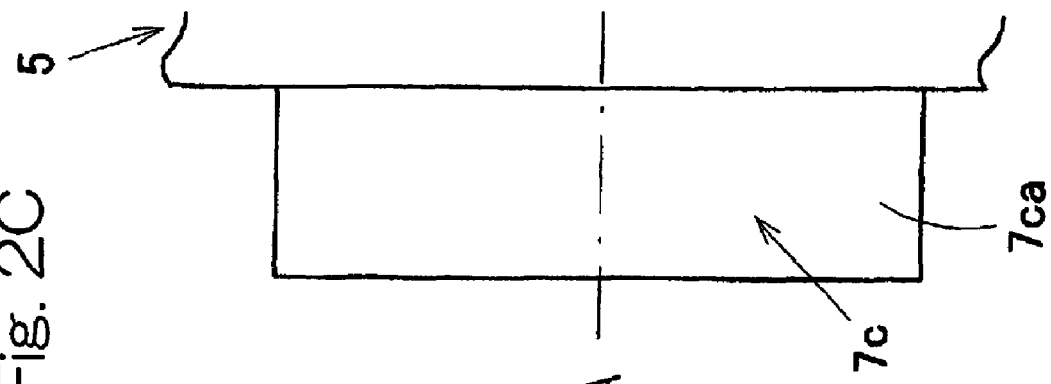
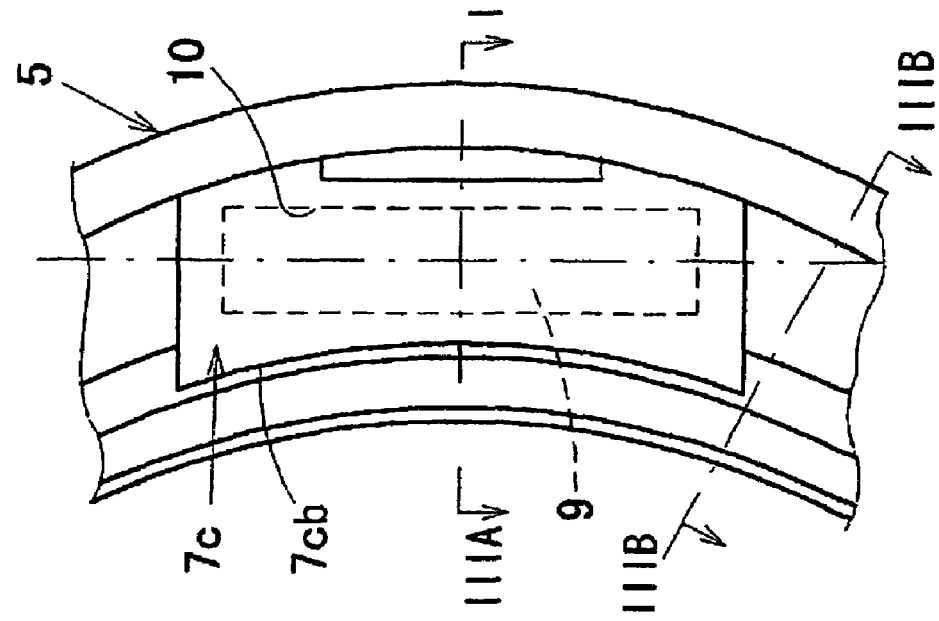
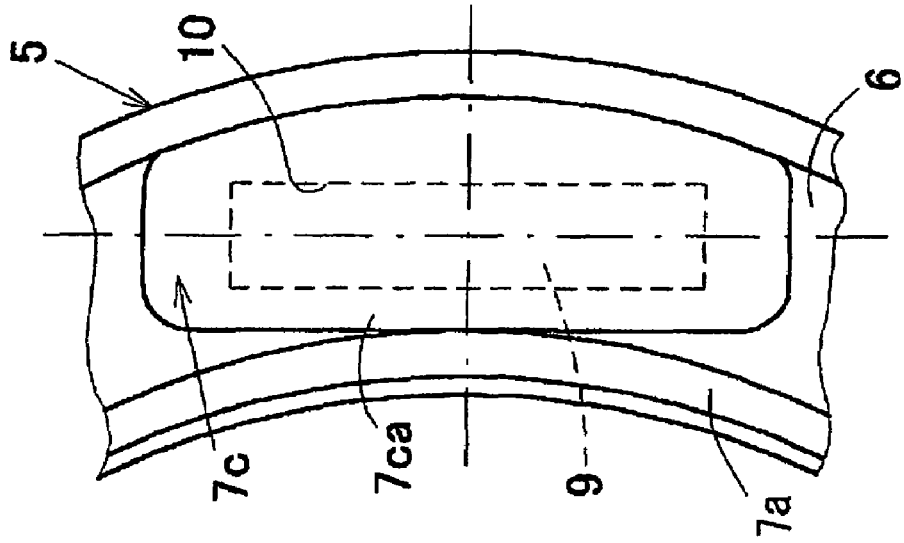

Fig. 3A
Fig. 3B
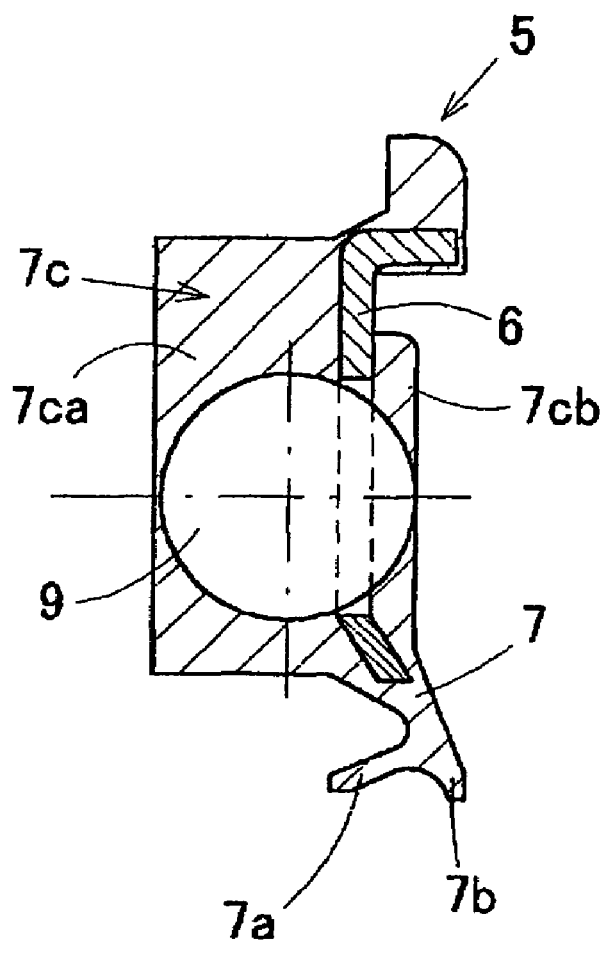
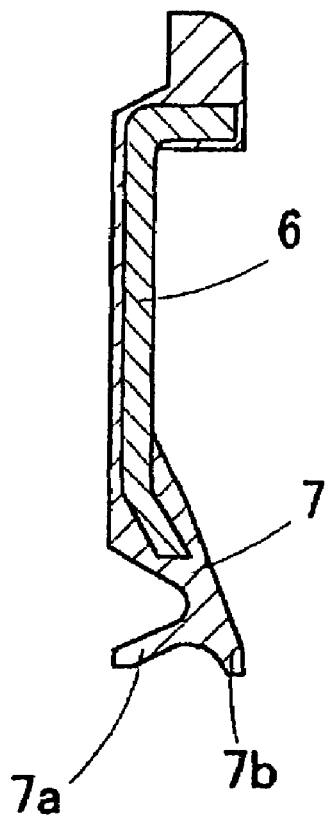

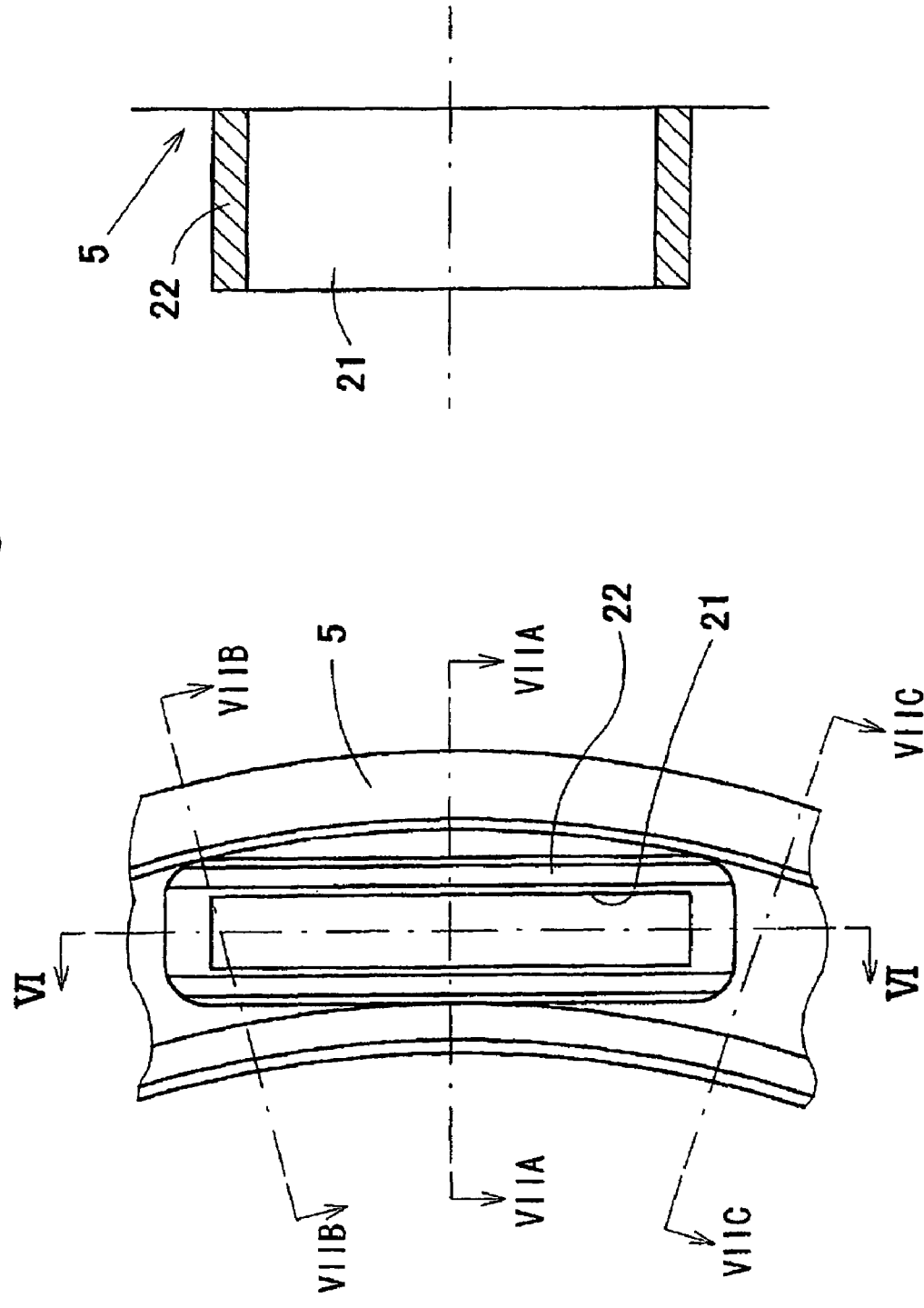

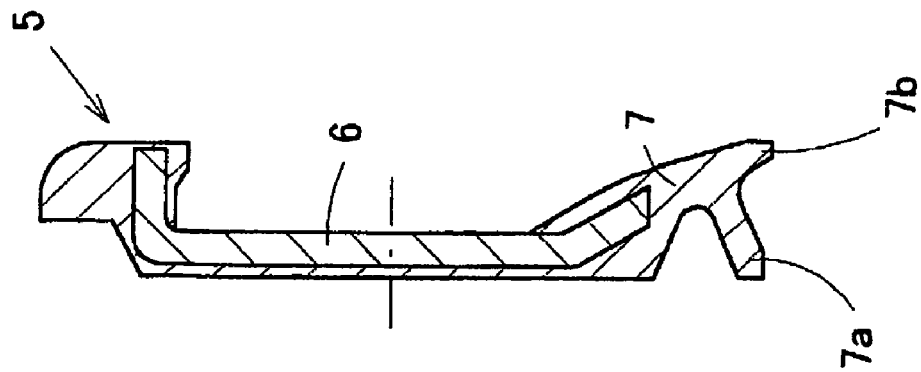
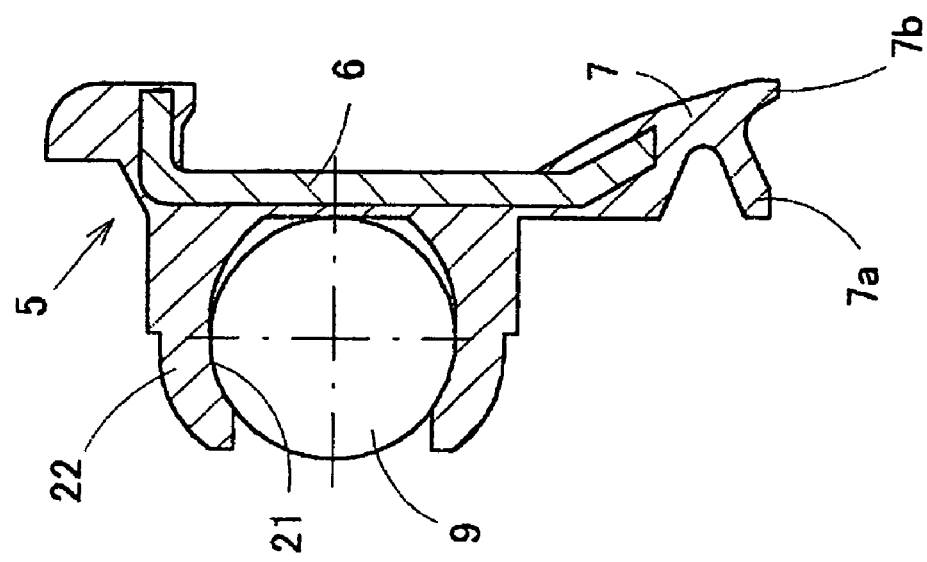
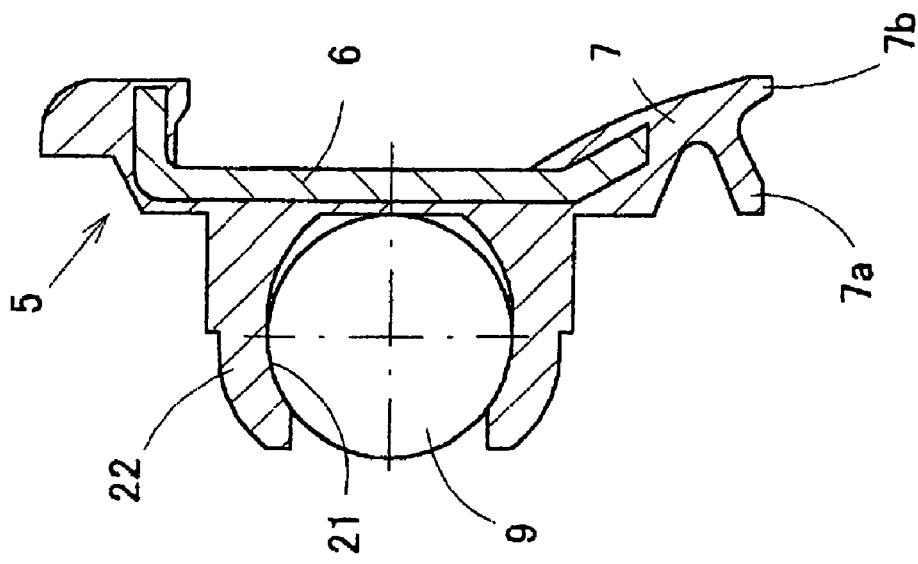

BEARING WITH IC TAG AND SEAL FOR THE SAME

FIELD OF THE INVENTION

The present invention relates to a bearing device having incorporated therein an IC tag capable of performing communication on a non-contact basis and a sealing member therefor.

BACKGROUND ART

It has hitherto been a general practice for the bearing device to have the model number, precision code, special requirement code and manufacturing lot number marked in the product itself or printed in a package thereof. However, the contents that can be born in the bearing device and/or the package thereof are limited to the minimum.

As IC tags which are affixed to various products and which are compact in size and capable of recording a large amount of information therein, various IC tags for use in radio frequency identification (RFID) have hitherto been developed, which utilizes the RFID technology. (See, for example, the Japanese Laid-open Patent Publication No. 2002-298116.)

However, the bearing identification information represented by the numbering conventionally marked in the packages containing bearing devices has a problem in that it tends to be lost or become illegible after the bearing device has been assembled. The markings made in the respective bearing devices contain so small an amount of information marked, that individual identification of those bearing devices may not be possible to achieve.

In view of the foregoing, attempts have been made to affix an RFID-based IC tag capable of accommodating a large amount of information directly to each of the bearing devices. Where the IC tag is to be fitted to a bearing device, a problem tends to occur, which is associated with absorption and reflection of radio waves in and from raceway members and, therefore, it is considered feasible to fit the IC tag to a sealing member rather than to the raceway member. Specifically, since the RFID-based IC tag makes use of microwaves, mounting of the RFID-based IC tag on the bearing device makes it impossible for the RFID-based IC tag to be read out because during the information reading raceway members and so forth of the bearing device absorb the microwaves. Although the IC tag itself is available, which is so designed as to be affixed directly to metallic components, such tag is expensive and bulky.

However, even where the IC tag is fitted to the sealing member, the RFID-based IC tag having a heat resistance enough to withstand the environment of use of the bearing device must be provided with a member such as, for example, a sheath outside the IC tag. On the other hand, if the antenna of the tag is in the form of a coil antenna, such antenna employs such a structure, in which a winding is spirally wound a number of turns in order to secure a longer distance of travel of radio waves, and the tag including such antenna therefore tends to have an increased size in respective directions widthwise and thicknesswise thereof. In the case of the RFID-based IC tag for general use, an RFID-based IC tag of a size comparable with, for example, a single rice of rice has been developed at the sacrifice of the storage capacity, but the RFID-based IC tag particularly utilizable with the bearing device has no other way than to have a large size to a certain extent in order to secure the heat resistance and the longer distance of travel of radio waves. With increase in size of the IC tag, the IC tag is required be solildly fixed to the sealing member.

DISCLOSURE OF THE INVENTION

An object of the present invention is to provide an IC-tagged bearing device, in which the IC tag can easily and assuredly fitted to the bearing device and can easily be protected from an environment of, for example, elevated temperature, whereby transmitting and receiving characteristic that is stable for a long time can be obtained, and a sealing member for use therein.

The IC-tagged bearing device according to the present invention is such as to include a sealing member including a core metal provided with an elastic element that is made of rubber or resin, which sealing member seals a bearing space, delimited between raceway members, in which an IC tag capable of performing communication on a non-contact basis is held as embedded in the elastic element. For the IC tag capable of performing communication on a non-contact basis, an RFID-based IC tag can be employed. As to the condition in which the IC tag is embedded in the elastic element, the IC tag may be embedded either in its entirety or in part.

According to the foregoing construction, using the IC tag fitted to the sealing member, various pieces of information concerning the bearing member can be stored and the stored information can be read out even after the bearing device has been incorporated in a machine. Since the IC tag is attached to the sealing member, unlike the case in which the IC tag is attached to either one of the raceway members, the problem associated with absorption and reflection of the radio waves in and from metal can easily be alleviated and, also, in terms of working of the component parts of the bearing device, fitting of the IC tag to the bearing device can easily be accomplished. Since the position where the IC tag is attached lies in the sealing member, replacement of the sealing member, that is effected in the event of damage to the IC tag, can result in that the bearing device can yet exhibit a predetermined performance that is required in the IC tag.

With respect to the fitting of the IC tag to the sealing member, the IC tag is held embedded in the elastic element of the sealing member and, accordingly, the IC tag can be solidly fixed. Also, since the elastic element made of the rubber or resin material exists around the IC tag, it is possible to protect the IC tag from the external environment of, for example, elevated temperatures.

Where the elastic element is made of the rubber, the IC tag may fixedly bonded to the elastic element by vulcanization which is effected when the rubber is vulcanized.

The use of bonding by vulcanization allows it to be solidly fixed even without the need to use any bonding agent. Also, unlike the structure in which it is physically fixed by means of a caulking technique, no deformation is induced in the IC tag.

In the present invention, the core metal may be provided with an IC tag positioning hole and a portion of the IC tag may be engaged in this IC tag positioning hole.

The provision of the positioning hole in the core metal can facilitate positioning of the IC tag and the IC tag can be fitted in such a manner as to protrude in part forwardly and in part rearwardly of the core metal; thereby alleviating the possibility that the IC tag may be biased on a front or rear side of the core metal and, thus, the IC tag can be fitted to the sealing member in a stabilized fashion.

In the present invention, the elastic element may be provided with an IC tag fitting groove and the IC tag may be fitted in the form as engaged in this IC tag fitting groove. The IC tag may be either fixed in the fitting groove by the use of the bonding agent or retained simply by engagement.

When the IC tag fitting groove is employed and the IC tag is engaged therein, the IC tag can easily and assuredly fitted to the sealing member. Where the bonding agent is concurrently employed, it is possible to secure the IC tag rigidly. Also, unlike the case in which it is bonded by vulcanization, thermal stresses which occur during the bonding by vulcanization can be avoided at the time the IC tag is fixed. Thus, even where the IC tag is engaged in the IC tag fitting groove, unlike the structure in which it is physically fixed by means of a caulking technique, no deformation is induced in the IC tag.

The IC-tagged sealing member according to the present invention is a sealing member for sealing a bearing space delimited between raceway members in a bearing device of the present invention and includes a core metal provided with an elastic element that is made of rubber or resin, an IC tag capable of performing communication on a non-contact basis held as embedded in the elastic element.

When the IC-tagged sealing member of the structure described above is used, fitting of the IC tag to the bearing device of the present invention is easy and assured and protection of the IC tag from the external environment of, for example, elevated temperatures can easily be accomplished, thus obtaining the transmitting and receiving characteristic that is stable for a long time.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 1A is a longitudinal sectional view of an IC-tagged bearing device according to a first preferred embodiment of the present invention;

FIG. 1B is a longitudinal sectional view, showing on an enlarged scale a sealing member employed in the IC-tagged bearing device shown in FIG. 1A;

FIG. 2A is a fragmentary front elevational view of the sealing member employed in the IC-tagged bearing device;

FIG. 2B is a fragmentary rear view of the sealing member shown in FIG. 2A;

FIG. 2C is a fragmentary side view of the sealing member shown in FIG. 2A, which shows a front protruding portion of the sealing member;

FIG. 3A is a cross-sectional view taken along the line IIIA-IIIA in FIG. 2B;

FIG. 3B is a cross-sectional view taken along the line IIIB-IIIB in FIG. 2B;

FIG. 6A is a fragmentary front elevational view of the sealing member employed in the IC-tagged bearing device shown in FIG. 5A;

FIG. 6B is a cross-sectional view taken along the line VI-VI in FIG. 6A;

FIG. 7A is a cross-sectional view taken along the line VIIA-VIIA in FIG. 6A;

FIG. 7B is a cross-sectional view taken along the line VIIB-VIIB in FIG. 6A; and FIG. 7C is a cross-sectional view taken along the line VIIC-VIIC in FIG. 6A.

BEST MODE FOR CARRYING OUT THE INVENTION

Figure 4:
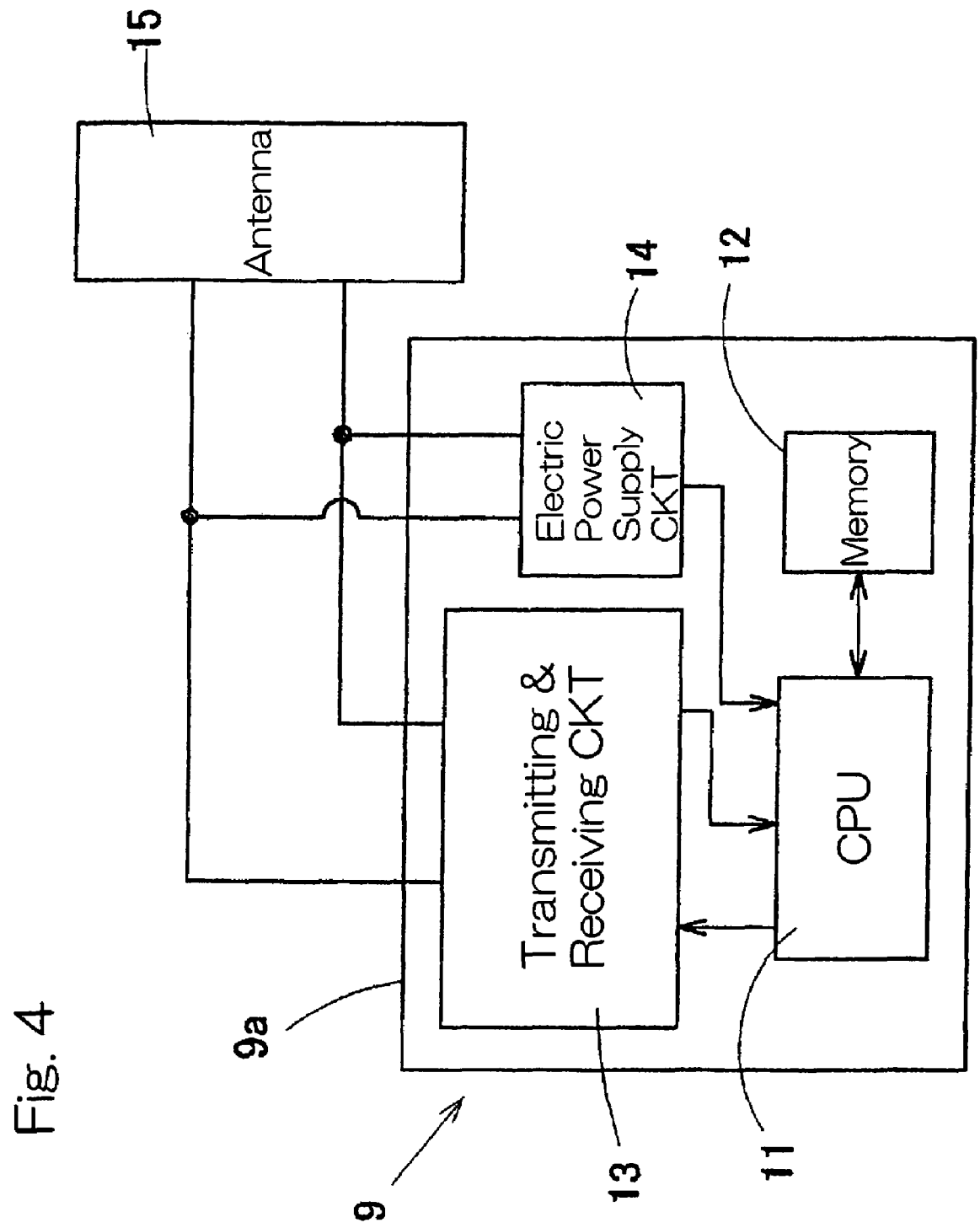
FIG. 4 is a circuit block diagram showing an electric circuit for the IC-tag employed in the IC-tagged bearing device.

The first preferred embodiment of the present invention will be described in detail with particular reference to FIGS. 1 to 3. An IC-tagged bearing device shown therein includes inner and outer races 1 and 2, which are respective raceway members and which have respective raceway surfaces 1a and 2a defined therein, rolling elements 3 interposed between the raceway surfaces 1a and 2a, a retainer 4 for retaining the rolling elements 3 in a circular row, and a sealing member 5 fitted to each end of the bearing device. The rolling elements 3 are in the form of a ball and the illustrated bearing device is in the form of a deep groove ball bearing.

The sealing member 5, shaped to represent a ring shape, is in the form of a contact seal of a kind, in which a rubber-like elastic element 7 is provided in a core metal 6, and is fitted to either one of the inner and outer races 1 and 2 opposed to each other in a radial direction. In the illustrated embodiment, the sealing member 5 has its outer peripheral edge engaged in a seal fitting groove 8 defined in an inner peripheral surface of the outer race 2, with sealing lips 7a and 7b in an inner peripheral portion thereof held in sliding engagement with an outer peripheral surface of the inner race 1. The core metal 6 is in the form of a ring-shaped press-worked metal plate such as, for example, a steel plate. The core metal 6 may be covered in its entirety with the rubber-like elastic element 7 or may have a part thereof exposed to the outside through the rubber-like elastic element 7, but the core metal 6 should not be exposed to the outside at a portion where the sealing member 5 is held in contact with any raceway member, that is, the inner and outer races 1 and 2 and should not be held in contact with any raceway member. In the illustrated embodiment, one of opposite surfaces of the core metal 6 confronting outwardly of the bearing device is covered in its entirety with the rubber-like elastic element 7.

The sealing member 5 referred to above is provided with an IC tag 9 of a kind capable of performing communication on a non-contact basis. This IC tag 9 is held in position as embedded in the elastic element 7. Where the elastic element 7 is made of rubber, the IC tag 9 may be bonded by vulcanization to the elastic element 7. Specifically, the elastic element 7 has a thick wall area 7c defined at a circumferential portion thereof, and the IC tag is embedded in this thick wall area 7c.

The core metal 6 has a positioning hole 10 defined therein for positioning the IC tag 9, and the IC tag 9 has a portion thereof engaged in this positioning hole 10. The IC tag 9 is so engaged in the positioning hole 10 that the IC tag 9 may protrude in part forwardly and in part rearwardly with respect to the core metal 6.

In the instance now under discussion, the IC tag 9 used therein is of a cylindrical shape and is partly inserted into the positioning hole 10 in the core metal 6 from a front side so that the IC tag 9 can be arranged so as to lie parallel to a direction of the tangential line extending in touch with the circumference of the annular sealing member 5. The width of the positioning hole 10 as measured in a direction radially of the sealing member 5 is so smaller than the diameter of the IC tag 9 that the IC tag 9 has a major portion thereof protruding forwardly of the core metal 6 (i.e., towards the outside of the bearing device) and the remaining portion protruding rearwardly. Accordingly, the thick wall area 7c of the elastic element 7, where the IC tag 9 is embedded, has forwardly and rearwardly protruding portions 7ca and 7cb, and the forwardly protruding portion 7ca protrudes forwardly a distance greater than the distance over which the rearwardly protruding portion 7cb protrudes rearwardly.

FIGS. 2A and 2B illustrates a circumferential portion of the sealing member 5, where the thick wall area 7c is defined, as viewed from front of the sealing member and from rear of the sealing member, respectively. The positioning hole 10 is of a rectangular shape as shown by the broken line in those figures. The forwardly protruding portion 7ca of the thick wall area 7c is of a rectangular shape extending along the positioning hole 10 and a portion thereof on a radially outer side of the sealing member is of an arcuate shape extending along the outer periphery of the sealing member, whereas the rearwardly protruding portion 7cb is of an arcuate shape extending in a direction circumferentially of the sealing member 5. The forwardly protruding portion 7ca of the thick wall area 7c has a side shape representing a rectangular shape as shown in FIG. 2C.

FIG. 3A illustrates a longitudinal sectional view of a portion of the sealing member 5, where the IC tag 9 is positioned and FIG. 3B illustrates a longitudinal sectional view of another portion of the sealing member 5, where the IC tag 9 is not positioned.

The sealing member 5 is manufactured by a method including the following steps (1) to (6):
(1) The core metal 6 is arranged on a mold surface of a lower mold (not shown) provided with a cavity.
(2) The IC tag 9 is arranged in the positioning hole 10 defined in the core metal 6.
(3) A vulcanization bonding agent is applied to respective entire surfaces of the core metal 6 and the IC tag 9, which are to be bonded with rubber.
(4) An unvulcanized rubber sheet is placed on the mold surface of the lower mold.
(5) An upper mold (not shown) is then lowered so that the upper mold and the lower molds are clamped together under pressure, and this condition is maintained for a predetermined length of time enough to allow vulcanization of the rubber to take place.
(6) The mold assembly is opened and the resultant produce, that is, the sealing member 5 is removed therefrom.

For the IC tag 9, for, example, an RFID-based IC tag operable based on the RFID (Radio Frequency IDentification) technology is used. This RFID-based IC tag is available in various types which utilize, as a transmission system, electrostatic coupling, electromagnetic coupling, electromagnetic induction, radio waves such as, for example, microwaves, and light, but the RFID-based IC tag operable with radio waves such as, for example, microwaves is employed in the illustrated embodiment.

FIG. 4 illustrates a circuit block diagram showing the electric circuit usable with the IC tag 9. The IC tag 9 includes, for example, an independent IC chip 9a and an antenna 15. The chip 9a is made up of a central processing unit (CPU) 11, a memory 12, a transmitting and receiving circuit 13 and electric power supply circuit 14 capable of capturing an electric power through the antenna 15. The memory 12 is of a kind that does not require any electric power to store information therein. Information recording and reading in relation to the IC tag 9 is accomplished by utilizing an IC tag reader/writer (not shown) having an antenna held in face-to-face relation with the antenna 15.

According to the IC-tagged bearing device of the structure described hereinbefore, various pieces of information concerning the bearing device are stored in the IC tag 9 attached to the sealing member 6 and can be read out from the IC tag 9 even after the bearing device has been mounted on a machine. The contents of information to be stored in the IC tag 9 may include, for example, some or all of the kind of grease used in the bearing device to which the IC tag has been attached, precision of, for example, the gap in the bearing device, material types, hardness and heat treatment conditions of component parts of the bearing device, diameter and class of the rolling element, type of the sealing member, manufacturing lot number, manufacturing history, result of inspection, history on sales channels, maintenance information and others, and can be read out after the bearing device has completely been assembled in the machine.

Unlike the case in which the IC tag 9 is attached to either one of the inner and outer races 1 and 2, the IC tag 9 is attached to the sealing member 5 and, therefore, the problem associated with absorption and reflection of the radio waves in and from metal can easily be alleviated and, also, in terms of processed surfaces of the component parts of the bearing device, fitting of the IC tag to the bearing device can easily be accomplished. Since the position where the IC tag 9 is attached lies in the sealing member 5, replacement of the sealing member 5, that is effected in the event of damage to the IC tag 9, can result in that the bearing device can yet exhibit a predetermined performance that is required in the IC tag.

With respect to the fitting of the IC tag 9 to the sealing member 5, the IC tag 9 is held embedded in the elastic element 7 of the sealing member 5 and, accordingly, the IC tag 9 can be solidly fixed to such an extent that, so long as the elastic element 7 is damaged, the IC tag 9 can be kept fixed solidly. Unlike the structure in which it is physically fixed by means of a caulking technique, no deformation is induced in the IC tag 9. Bonding by vulcanization allows it to be solidly fixed even without the use of any commonplace bonding agent. Also, since the elastic element 7 made of the rubber or resin material and forming a part of the sealing member 5 exists around the IC tag 9, it is possible to protect the IC tag from the external environment of, for example, elevated temperatures.

Since as described hereinbefore, fitting of the IC tag 9 is accomplished assuredly, the transmitting and receiving characteristic that is stable for a long time can be obtained. Also, in view of the fact that the elastic element 7 around the IC tag 9 protects from the external environment, the transmitting and receiving characteristic that is stable for a long time can also be obtained.

In addition, since the positioning hole 10 for the IC tag 9 is provided in the core metal 6, positioning of the IC tag 9 can be accomplished easily; the IC tag 9 can be easily fitted in such a manner as to protrude in part forwardly and in part rearwardly of the core metal; the possibility that the IC tag 9 may be biased on a front or rear side of the core metal can be alleviated; and the IC tag 9 can be fitted to the sealing member 5 in a stabilized fashion.

Figure 5A:
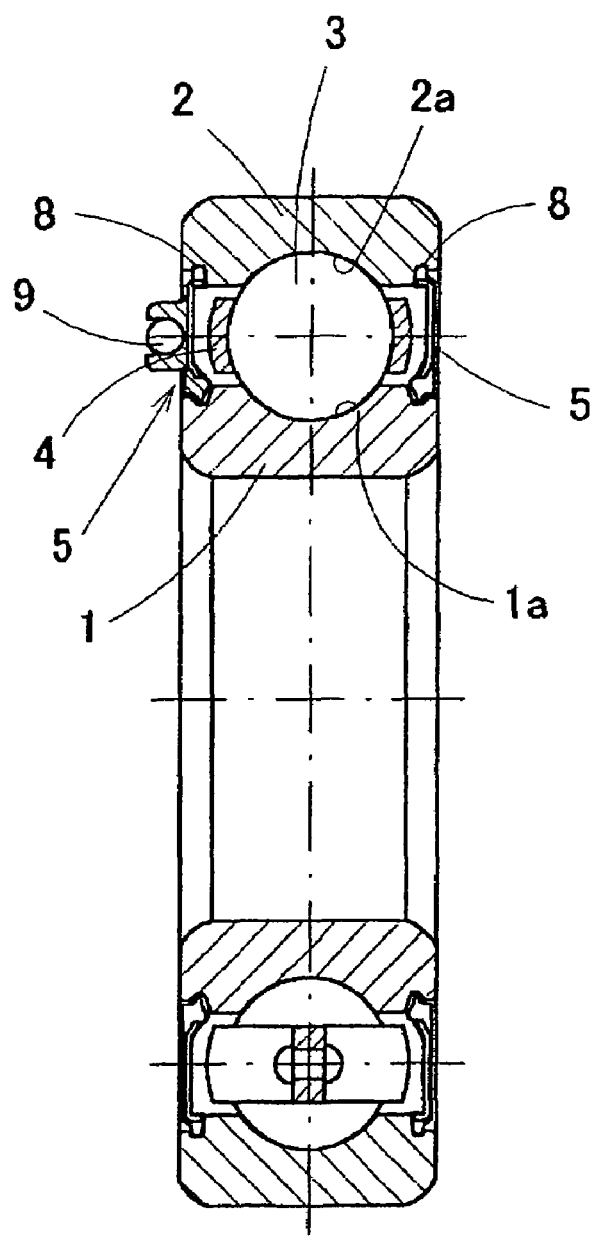
FIG. 5A is a longitudinal sectional view of an IC-tagged bearing device according to a second preferred embodiment of the present invention.
Figure 5B:
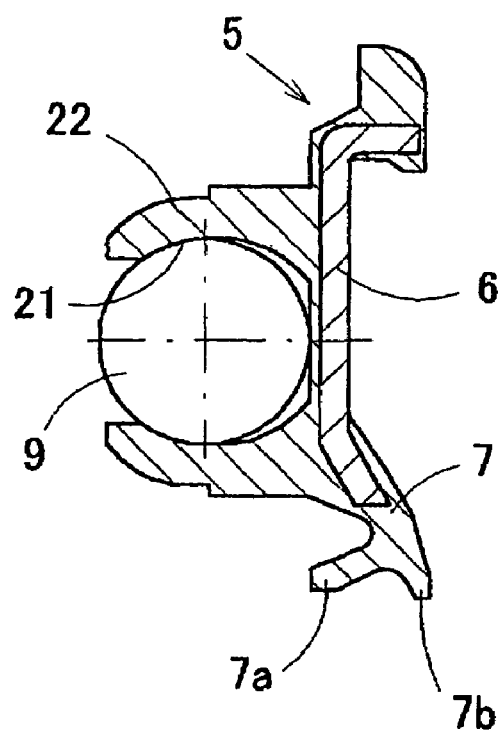
FIG. 5B is a longitudinal sectional view, showing on an enlarged scale the sealing member employed in the IC-tagged bearing device shown in FIG. 5A.

FIGS. 5 to 7 illustrates a second preferred embodiment of the present invention. According to this embodiment, as a structure for fitting the IC tag 9 to the sealing member 5, the elastic element 7 is provided with an IC tag fitting groove 21 and the IC tag 9 is fitted in a fashion engaged in this IC tag fitting groove 21. Specifically, after the sealing member 5 has been molded to a shape provided with the IC tag fitting groove 21, the IC tag 9 is fitted to the sealing member 5 in a fashion engaged in the IC tag fitting groove 21. In such case, it is preferable that the IC tag 9 is fixed to an inner surface of the IC tag fitting groove 21 by the use of a bonding material.

The IC tag fitting groove 21 is formed by molding so that an enclosing wall 22 can be formed in the elastic element 7 in the form as protruding therefrom at a front surface side of the sealing member 6 with respect to the core metal 6. In other words, the enclosing wall 22 has an inner space defining the IC tag fitting groove 21. The enclosing wall 22 is of a rectangular frame shape and provided parallel to the tangential line extending in a direction circumferentially of the sealing member 5. For this reason, as best shown in FIGS. 7A and 7B showing cross-sectional views taken along the lines VIIA-VIIA and VIIB- and VIIB in FIG. 6, depending on the position circumferentially of the sealing member 5, the enclosing wall 22 has different positions radially of the core metal 6. FIG. 7C illustrates a portion of the sealing member 5 where the IC tag 9 is not positioned. That portion of the sealing member 5, where the IC tag 9 is not positioned, has a sectional shape similar to that in the previously described first embodiment. As is the case with that in the previously described first embodiment, the IC tag 9 employed in the second embodiment has an outer appearance representing a cylindrical shape.

The sealing member 5 is manufactured by a method including the following steps (1) to (6):
(1) The core metal 6 is arranged on a mold surface of a lower mold (not shown) provided with a cavity.
(2) A vulcanization bonding agent is applied to respective entire surfaces of the core metal 6 which are to be bonded with rubber.
(3) An unvulcanized rubber sheet is placed on the mold surface of the lower mold.
(4) An upper mold (not shown) is then lowered so that the upper mold and the lower molds are clamped together under pressure, and this condition is maintained for a predetermined length of time enough to allow vulcanization of the rubber to take place.
(5) The mold assembly is opened and the resultant produce, that is, the sealing member 5 is removed therefrom.
(6) After the bonding agent is injected into the IC tag fitting groove 21 defined in the sealing member 5, the IC tag 9 is inserted to fix.

According to the second embodiment as hereinabove described, a major portion of the IC tag 9 except for a front surface portion thereof is held embedded in the elastic element 7 and, accordingly, the IC tag 9 can be protected from the external environment. Also, since the IC tag fitting groove 21 is defined and the IC tag 9 is then engaged therein, the IC tag 9 can further easily be fitted to the sealing member 5. Yet, the bonding agent can be easily and precisely injected into the IC tag fitting groove 21 accommodating therein the IC tag 9 and, therefore, a solid bonding force can be exerted stably. In addition, unlike the case in which the IC tag 9 is fitted using a bonding by vulcanization technique, thermal stresses which occur during the bonding by vulcanization can be avoided at the time the IC tag 9 is fixed.

As hereinbefore described, even when the IC tag 9 is fitted inside the groove 21, unlike the structure in which it is physically fixed by means of a caulking technique, no deformation is induced in the IC tag 9. Also, since the elastic element 7 made of the rubber or resin material and forming a part of the sealing member 5 exists around the IC tag 9, it is possible to protect the IC tag from the external environment of elevated temperature.

Other structural features of and effects derived from the second embodiment discussed above are similar to those afforded by the previously described first embodiment.

Although in describing any of the first and second embodiments of the present invention, reference has been made to the deep groove ball bearing, the present invention can be equally applied to any type of bearing equipped with the sealing member. By way of example, the present invention is equally applicable to a radial bearing such as, for example, a cylindrical roller bearing, a tapered roller bearing, self-aligning bearing, angular contact ball bearing and center bearing and also to a thrust bearing. Also, the present invention is equally applicable to any other special bearing such as, for example, a wheel support bearing for cars and for any special use. The IC-tagged bearing device according to the present invention may not necessarily be of a type including a pair of raceway members as an independent bearing, but may be of a type in which one of the inner and outer raceway members is omitted, but a shaft or a housing of a machine utilizing the bearing serves as the other of the raceway members.

What is claimed is:
1. An IC-tagged bearing device comprising:
a sealing member comprising:
a core metal;
an elastic element that is made of rubber or resin disposed on the core metal; and
an IC tag embedded in the elastic element,
wherein the sealing member seals a bearing space, delimited between raceway members,
wherein the IC tag is capable of performing communication on a non-contact basis,
wherein the IC tag is a cylinder, and arranged such that a longitudinal axis of the cylinder is outside the raceway members.

2. The IC-tagged bearing device as claimed in claim 1, wherein the elastic element is made of the rubber and the IC tag is fixedly bonded by vulcanization to the elastic element.

3. The IC-tagged bearing device as claimed in claim 1, wherein the core metal is provided with an IC tag positioning hole and a portion of the IC tag is engaged in this IC tag positioning hole.

4. The IC-tagged bearing device as claimed in claim 1, wherein the elastic element is provided with an IC tag fining groove and the IC tag is fitted in the form as engaged in this IC tag fitting groove.

5. An IC-tagged sealing member for sealing a bearing space delimited between raceway members in a bearing device comprising:
a core metal
an elastic element that is made of rubber or resin disposed on the core metal; and
an IC tag embedded in the elastic element, capable of performing communication on a non-contact basis
wherein the IC tag is a cylinder, and arranged such that a longitudinal axis of the cylinder is outside the raceway members.

6. The IC-tagged sealing member as claimed in claim 5, wherein the elastic element is made of the rubber and the IC tag is fixedly bonded by vulcanization to the elastic element.

7. The IC-tagged sealing member in claim 5, wherein the elastic element is provided with an IC tag fitting groove and the IC tag is fitted in the form as engaged in this IC tag fitting groove.

* * * * *

UNITED STATES PATENT AND TRADEMARK OFFICE
CERTIFICATE OF CORRECTION

| | |
|---|---|
| PATENT NO. | : 7,534,045 B2 |
| APPLICATION NO. | : 10/580704 |
| DATED | : May 19, 2009 |
| INVENTOR(S) | : Tatsuo Nakajima et al. |

Page 1 of 1

It is certified that error appears in the above-identified patent and that said Letters Patent is hereby corrected as shown below:

In Claim 4, column 8, line 45, the word "fi<u>n</u>ing" should read --fi<u>tt</u>ing--.

Signed and Sealed this

Fourth Day of August, 2009

JOHN DOLL
*Acting Director of the United States Patent and Trademark Office*